Nov. 2, 1965  A. ADAMS  3,215,509
LEACHING HALITE VALVES FROM LANGBEINITE
Filed Aug. 8, 1963  2 Sheets-Sheet 1

Inventor:
Albert Adams
By: James E. Wolber
Attorney

United States Patent Office 3,215,509
Patented Nov. 2, 1965

3,215,509
LEACHING HALITE VALUES FROM LANGBEINITE
Albert Adams, Carlsbad, N. Mex., assignor to International Minerals & Chemical Corporation, a corporation of New York
Filed Aug. 8, 1963, Ser. No. 300,835
11 Claims. (Cl. 23—312)

This invention relates to a method for the concentration of langbeinite ores. More particularly, this invention relates to a method for the concentration of mixed ores containing langbeinite and halite by leaching with an aqueous liquid.

Langbeinite is a valuable source of fertilizer material since it contains potassium, magnesium, and sulfur, all of which are fertilizer ingredients. Further, langbeinte is readily converted by known techniques into potassium sulfate and magnesium chloride by reaction with sylvite. It is known that langbeinite can be concentrated by leaching out soluble impurities with water. Typical langbeinite ores of good qualities show the following analysis:

Table I

|  | Percent |
|---|---|
| Langbeinite | 35 |
| Halite | 55 |
| Sylvite | 8 |
| Other impurities | 2 |

The only known langbeinite reserves of commercial quality are located in southeastern New Mexico. In this area, water is exceedingly scarce. It is therefore necessary that a commercial process for concentration of langbeinite ore by leaching with water be designed to provide optimum water utilization efficiencies. It is further necessary, to meet commercial standards, that the product langbeinite have a purity of about 98%. The 2% impurities are chiefly halite. Utilization of the smallest possible quantities of water in langbeinite ore concentration is also important because langbeinite displays some solubility in water, and therefore the greater the quantities of water used, the greater will be the loss of langbeinite in waste waters.

It is the principal object of this invention to provide an improved process for the concentration of langbeinite are by leaching with an aqueous liquid, usually water.

It is another object of this invention to provide a process for the concentration of langbeinite ores by leaching with water, whereby a langbeinite product of commercial grade is obtained with reduced loss of langbeinite to the waste waters.

Yet another object of this invention is to provide a process for the concentration of langbeinite ores by leaching with water in which langbeinite of commercial purity is obtained while the quantities of water required are reduced.

Briefly, the method of this invention comprises screening langbeinite ore, which has been comminuted to −3 mesh, to separate a predominantly −3 +8 mesh fraction and a predominantly −8 mesh fraction. The coarse and fine fractions are separately concentrated by first leaching the coarse fraction with water to reduce the halite content of the ore to no more than about 2%. The effluent from the leaching operation will have a halite concentration of about 40% of saturation. This effluent is then utilized to leach the fine ore fraction to reduce the halite content thereof to not more than about 2%. The effluent from the fine ore leaching operation displays a halite concentration of about 90% of saturation.

The leaching of the coarse fraction requires a contact time of about 12 to 20 minutes. The leaching of the fine fraction requires a contact time of about 2 to 4 minutes. In contradistinction, to produce a langbeinite product having not in excess of about 2% halite from a similar langbeinte ore which has been comminuted to −3 mesh but which is leached as a single fraction, it is necessary to provide a leaching time of about 15 to 20 minutes utilizing a greater quantity of water. The effluent water will have a halite content of about 80% of saturation. The langbeinite concentration of the effluent water is substantially the same in either process, but because of the greater quantities of water required when a single fraction is treated, the total langbeinite loss is increased.

In accordance with this invention, it is also possible to treat a separated coarse ore fraction and a separated fine ore fraction by parallel leaching with separate batches of water. In this manner, the langbeinite losses can be maintained at a tolerable level, but will be somewhat higher than when a series operation is employed in which the same quantity of water is used first to leach the coarse ore and then to leach the fine ore. Also, the quantities of water required in parallel operation are greater than required for series operation.

The invention will be described in detail with reference to the drawing, of which:

Figure 1:
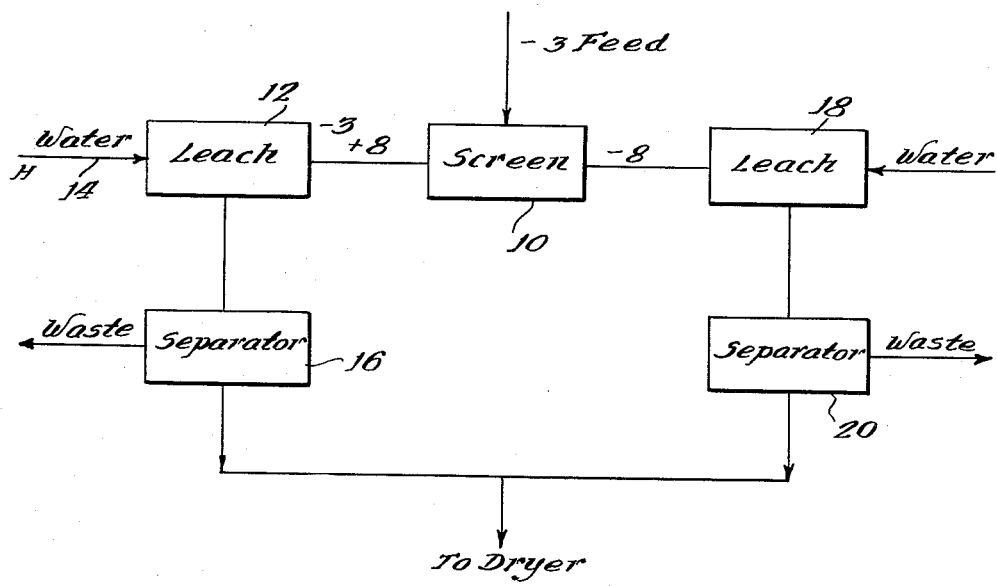
FIGURE 1 is a schematic diagram of a parallel flow circuit for the concentration of langbeinite in accordance with this invention.

Referring to FIGURE 1, a langbeinite ore feed material constituted as set forth in the table, which has been comminuted to a −3 mesh is separated at screen 10 to produce a coarse fraction consisting predominantly of −3 +8 mesh ore, and a fine fraction consisting predominantly of −8 mesh ore. The coarse fraction is conveyed to leach tank 12. Water is introduced through line 14 and the coarse ore is slurried to dissolve the halite therefrom. A time of about 12 to 20 minutes is required to reduce the halite content of the ore to an acceptable level. The slurry is conveyed to separator 16 where the water is removed to waste. The concentrated langbeinite is then passed to a dryer. The fine ore fraction is conveyed from screen 10 to leach tank 18. Water is introduced to leach tank 18 and the ore is slurried for a period of about 2 to 4 minutes to reduce the halite content to an acceptable level, about 2%. It will be understood that in the coarse of leaching the halite content from the ore, the sylvite and other impurities in the ore will be dissolved therefrom so that the product langbeinite will be substantially free from impurities other than the above mentioned 2% of halite. The slurry is then conveyed to separator 20 where the product langbeinite is separated from waste water.

By limiting the contact time between the fine ore particles and the treating water to about 2 to 4 minutes, a satisfactory product langbeinite can be obtained with minimum loss of langbeinite to the wash water. As aforementioned, 12 to 20 minutes is required to leach the coarse fraction. Were the ore to be treated as a single fraction, the period of treatment would have to be as long as the time required to treat the coarse fraction. It has been found that such would result in excessive losses of langbeinite from the fine particles to the wash water.

Figure 2:
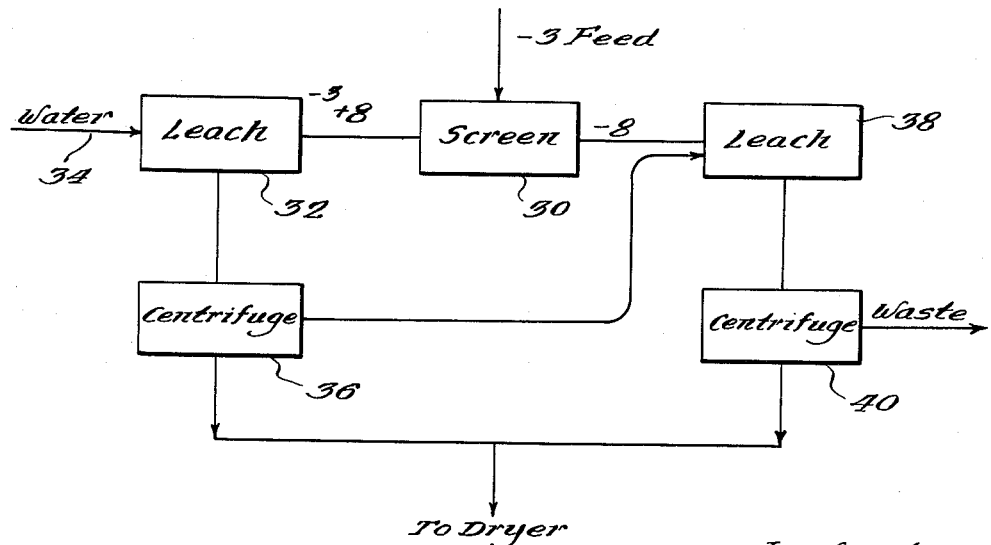
FIGURE 2 is a schematic diagram of a series water flow circuit for the concentration of langbeinite in accordance with this invention.

Improved water utilization can be obtained by using the circuit shown in FIGURE 2. In operation, a langbeinite ore feed having a composition as shown in the table is fed to screen 30 where it is separated into a predominantly −3 +8 mesh coarse fraction and a predominantly −8 fine fraction. The coarse fraction is conveyed to leach tank 32. Water is introduced to leach tank 32 through line 34, and the coarse fraction is slurried for a period of 12 to 20 minutes to reduce the halite concentration of the ore to about 2%. The slurry is then conveyed to centrifuge 36 and the aqueous phase is separated from the product coarse langbeinite. The fine ore fraction is conveyed from screen 30 to leach tank 38. Aqueous liquid separated at centrifuge 36 is conveyed to leach tank 38. This liquid will have a halite content of about 40% of saturation. The fine ore in leach tank 38 is treated with the aqueous liquid for a period of 2 to 4 minutes and the slurry is conveyed to centrifuge 40 where the aqueous liquor, now having a halite concentration of approximately 90% of saturation, is removed and discarded. The coarse langbeinite product and the fine langbeinite product are combined and conveyed to a dryer.

Figure 3:
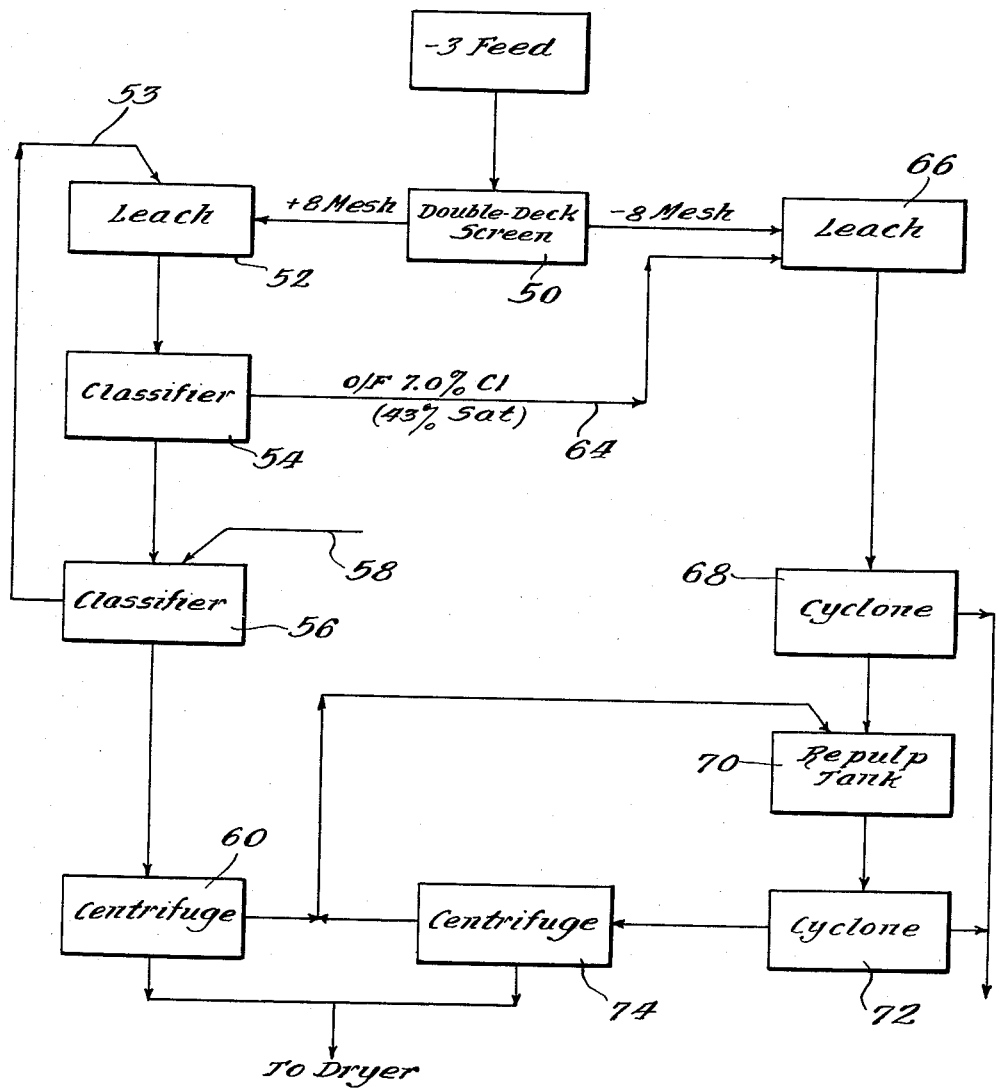
FIGURE 3 is a schematic diagram of a preferred circuit for the concentration of langbeinite in accordance with this invention.

Referring to FIGURE 3, a preferred embodiment of the process of the invention is shown. Feed langbeinite ore containing 35.3% langbeinite, 54.5% halite, 8.5% sylvite and 1.7% other impurities is conveyed to single deck screen 50 at a rate of 158 tons per hour. The ore is separated to produce 76 tons per hour of −3 +8 mesh coarse ore and 82 tons per hour of −8 mesh fine ore. The coarse fraction is conveyed from screen 50 to leach tank 52, and 1,200 gallons per minute of aqueous liquid is introduced into leach tank 52 through line 53. The ore is leached with the aqueous liquor for about 15 minutes to reduce the halite content of the ore to about 2% by weight. The slurry is transferred to classifier 54 and aqueous liquor is separated from the concentrated ore at the rate of 1000 gallons per minute. The concentrated ore with the unseparated aqueous liquor is conveyed to second classifier 56 where it is scrubbed with water which is introduced to the classifier at the rate of 1200 gallons per minute through line 58. The wash water introduced through line 58 is separated from the concentrated ore in classifier 56 to provide aqueous liquid feed at the rate of 1,200 gallons per minute to leach tank 52, which is preferably a rotary, tumbler-type tank. Such tanks provide excellent agitation and simplify shutdown problems. Where, in accordance with this invention, the fine and coarse particles are separately leached, there is no substantial attrition of the fine particles in the tumbler-type tank. If a single, unseparated feed were treated, the attrition of fine particles by the coarse particles would make the use of a tumbler-type tank less attractive. The concentrated, washed langbeinite is conveyed together with water in the amount of 200 gallons per minute to centrifuge 60. Here the remaining wash water is separated from the product langbeinite, and the product langbeinite is conveyed to a dryer and product storage, not shown.

Aqueous liquor in the amount of 1,000 gallons per minute, which has a sodium chloride content of 43% saturation, is removed from classifier 54 through line 64 and delivered to leach tank 66. The fine ore fraction from double deck screen 50 is conveyed to leach tank 66 at the rate of 82 tons per hour. Here the ore is leached for about 3 minutes and then conveyed to cyclone 68, where the langbeinite is separated and the aqueous liquid now having a halite content of 90% is removed and sent to waste. The concentrated fine langbeinite, about 98% pure, is conveyed from cyclone 68 to repulp tank 70, where it is repulped with wash water in the amount of about 200 gallons per minute. This wash water was separated from the coarse concentrated langbeinite at centrifuge 60. The repulped fine langbeinite is then conveyed to cyclone 72 where a major portion of the repulp wash water is separated and conveyed to waste. The scrubbed, concentrated fine langbeinite, together with a minor portion of the wash water, is conveyed to centrifuge 74 where the fine langbeinite is separated from the wash water and conveyed to a dryer and storage, not shown. The water separated in centrifuge 74 is recycled to repulp tank 70. The combined langbeinite fine and coarse fractions have a purity of about 98%.

The preferred embodiment of this invention permits the production of product langbeinite of 98% purity from the same langbeinite ore with a 3% increase in langbeinite recovery and a 10% decrease in the quantity of water required, as compared to the highest efficiencies heretofore commercially obtained in the leaching of langbeinite ore as a single, unseparated −3 mesh fraction. The halite content of the aqueous liquid separated from the coarse fraction at classifier 54 will preferably be in the range of 35 to 45% of saturation. The halite content of the aqueous liquid separated from the fine fraction at cyclone 68 will preferably be in the range of 85 to 95% of saturation. These liquids will also contain some sylvite and other leached impurities. The halite concentration is controlled by adjusting the quantity of the water input to the process.

While the invention has been described with reference to the several preferred embodiments thereof, and has been illustrated by detailed specific examples, it will be understood that within the scope of the appended claims the invention can be practiced other than as specifically described.

The embodiments of the invention in which an exclusive property or privilege is claimed are as follows:

1. The method for concentrating langbeinite in an ore containing langbeinite and halite comprising separating the ore to produce a fine fraction and a coarse fraction, leaching said coarse fraction separately from said fine fraction with an aqueous liquid for time sufficient to dissolve substantially all of the halite therefrom, separating the aqueous liquid from said coarse fraction to recover coarse langbeinite substantially free of halite, leaching said fine fraction separately from said coarse fraction with the aqueous liquid separated from said coarse fraction for a time sufficient to dissolve substantially all of the halite from said fine fraction, and separating said aqueous liquid from said fine fraction to recover fine langbeinite substantially free of halite.

2. The method in accordance with claim 1 in which said coarse fraction consists predominantly of −3 +8 particles, and said fine fraction consists predominantly of −8 particles.

3. The method in accordance with claim 2 in which said coarse fraction is leached with water for about 12 to 20 minutes.

4. The method in accordance with claim 3 in which said fine fraction is leached with aqueous liquids separated from said coarse fraction for about 2 to 4 minutes.

5. The method in accordance with claim 4 including the step of adjusting the quantity of leach water such that the aqueous liquid separated from said coarse fraction has a halite content of about 35 to 45% of saturation, and the halite content of the aqueous liquid separated from said fine fraction has a halite content of about 85 to 95% of saturation.

6. The method for concentrating langbeinite in an ore containing langbeinite and halite comprising separating the ore to produce a fine fraction and a coarse fraction, leaching said coarse fraction separately from said fine fraction with an aqueous liquid for a time sufficient to dissolve substantially all of the halite therefrom, separating the aqueous liquid from said coarse fraction to recover coarse langbeinite substantially free of halite, washing said coarse langbeinite with wash water, separating said wash water from said coarse langbeinite, recirculating said wash water to provide said aqueous liquid for the leaching of said coarse fraction, leaching said fine fraction separately from said coarse fraction with the aqueous liquid separated from said coarse fraction, and separating said aqueous liquid from said fine fraction to recover fine langbeinite substantially free of halite.

7. The method in accordance with claim 6 including the steps of centrifuging said recovered coarse langbeinite to remove entrained wash water, repulping said recovered fine langbeinite with said removed wash water, and separating said removed wash water from the repulped fine langbeinite to recover fine langbeinite of improved purity.

8. The method in accordance with claim 7 in which the coarse fraction consists predominantly of −3 +8 particles, and the fine fraction consists predominantly of −8 particles.

9. The method in accordance with claim 8 in which said coarse fraction is leached with aqueous liquid for about 12 to 20 minutes.

10. The method in accordance with claim 9 in which said fine fraction is leached with aqueous liquid for about 2 to 4 minutes.

11. The method in accordance with claim 10 including the step of adjusting the quantity of water employed in the washing of said coarse langbeinite such that the said aqueous liquid separated from said coarse fraction prior to the water washing of said coarse fraction has a halite content of about 35 to 45% of saturation, and the halite content of the said aqueous liquid separated from said fine fraction prior to repulping said fine fraction has a halite content of about 85 to 95% of saturation.

References Cited by the Examiner

UNITED STATES PATENTS

| 2,596,407 | 5/52 | Jackson | 209—166 X |
| 2,676,705 | 4/54 | Duke | 209—166 |
| 2,837,403 | 6/58 | Gloss | 23—121 X |
| 2,974,884 | 3/61 | Martin | 23—121 X |
| 3,008,655 | 11/61 | Adams | 209—12 X |

FOREIGN PATENTS

| 614,756 | 2/61 | Canada. |

OTHER REFERENCES

Harley: "Langbeinite . . . Mining and Processing," Ind. and Engin. Chem., vol. 39, No. 1, January 1947, pp. 43–47.

NORMAN YUDKOFF, *Primary Examiner.*